United States Patent
Mahaney

(10) Patent No.: US 7,245,702 B1
(45) Date of Patent: Jul. 17, 2007

(54) METHOD AND APPARATUS FOR DETERMINING AND REPORTING THE OPERATIONAL STATUS OF AN INTEGRATED SERVICES HUB

(75) Inventor: Craig Mahaney, Milan, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/702,933

(22) Filed: Oct. 31, 2000

(51) Int. Cl.
*H04M 1/24* (2006.01)

(52) U.S. Cl. ............... 379/15.01; 379/32.04; 379/33

(58) Field of Classification Search ......... 379/15.01, 379/32.04, 33, 413, 27.06, 27.01, 29.04, 379/9.05, 93.01, 93.09, 207.02, 207.04, 48
See application file for complete search history.

(56) References Cited

U.S. PATENT DOCUMENTS

| | | | | |
|---|---|---|---|---|
| 5,017,799 A | * | 5/1991 | Fishman | 307/34 |
| 5,394,461 A | * | 2/1995 | Garland | 379/106.09 |
| 5,734,711 A | * | 3/1998 | Kleffner | 379/323 |
| 5,881,142 A | | 3/1999 | Frankel et al. | 379/167 |
| 5,963,620 A | | 10/1999 | Frankel et al. | 379/93.06 |
| 6,067,030 A | * | 5/2000 | Burnett et al. | 340/870.05 |
| 6,075,784 A | | 6/2000 | Frankel et al. | 370/356 |
| 6,141,339 A | | 10/2000 | Kaplan et al. | 370/352 |
| 6,272,209 B1 | * | 8/2001 | Bridger et al. | 379/27.01 |
| 6,272,553 B2 | | 8/2001 | Way et al. | |
| 6,297,620 B1 | | 10/2001 | Goodrich, II | |
| 6,351,534 B1 | * | 2/2002 | Phillips | 379/413 |
| 6,480,578 B1 | * | 11/2002 | Allport | 379/48 |
| 6,640,239 B1 | * | 10/2003 | Gidwani | 709/203 |
| 6,647,117 B1 | * | 11/2003 | Wallace et al. | 379/413 |

OTHER PUBLICATIONS

U.S. Appl. No. 09/197,044, filed Nov. 20, 1998, Way et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/687,683, filed Oct. 12, 2000, Bayerl et al.
U.S. Appl. No. 09/689,365, filed Oct. 12, 2000, Goodrich.

* cited by examiner

*Primary Examiner*—Barry Taylor

(57) ABSTRACT

The present invention discloses a method and apparatus for determining and reporting the operational status of an integrated services hub. The AC power supply and wide area network connection of the integrated services hub are monitored, and a signal is sent to a user upon detecting a problem. The AC power supply is preferably monitored through a bit on a power supply status register. The wide area network connection is preferably monitored through a network status register on a line interface chip or chip set residing in the integrated service hub and connected to the wide area network. The warning signal is preferably an audible warning tone played through a telephone receiver connected to the integrated services hub.

16 Claims, 2 Drawing Sheets

METHOD AND APPARATUS FOR DETERMINING AND REPORTING THE OPERATIONAL STATUS OF AN INTEGRATED SERVICES HUB

BACKGROUND OF THE INVENTION

The present invention relates to an integrated services hub (ISH) for use with broadband packet networks, and more specifically it relates to a method and apparatus for determining the operational status of the ISH and reporting that status to a user.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks that are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued Aug. 7, 2002, which is incorporated by reference herein in its entirety. The network communication medium typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the ISH and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring current, ringback, and busy signals. The terms off-hook and off-hook condition as used herein are generic terms meaning that a user device (whether telephone, facsimile machine, modem, etc.) connected to a telephone line is attempting to access and use the line.

Another example of such a central office function being provided by the ISH is backup power. Traditionally in cases of power grid failure, the central office provides backup power to customers' telephones through use of an industrial-strength, petroleum-fueled backup generator. Since it is not economical to equip each customer with a backup generator, an ISH must be equipped with an back-up power supply, which is typically a battery pack, to maintain power to the system in cases of power grid failure. The number of telephone interfaces impacts battery life, as the amount of power used by the ISH increases with the number of telephone interfaces being served. A method and apparatus for polling telephony line status in an integrated services hub to reduce power consumption is disclosed and claimed in U.S. Pat. No. 6,512,817, issued Jan. 28, 2003, incorporated by reference herein in its entirety. Likewise, the use of telephony services impacts how long the batteries can keep the ISH operational because more power is required to maintain phone lines in active (i.e., conversational) state as opposed to standby (i.e., on-hook) or disabled states. The present invention addresses a customer's need for information regarding the operational status of the ISH. For example, by alerting the customer to the fact that the ISH is operating on battery backup power, the customer can adjust his or her use patterns to maximize battery life.

SUMMARY OF THE INVENTION

The present invention discloses a method for determining the operational status of an integrated services hub, comprising monitoring the status of AC power to the integrated services hub, and upon detecting a failure of AC power, signaling to a user of the integrated services hub that AC power has failed. Monitoring the status of AC power to the integrated services hub preferably further comprises monitoring a bit on a power supply status register. Signaling to a user of the integrated services hub that AC power has failed preferably further comprises playing an audible warning tone in a telephone receiver connected to the integrated services hub.

The present invention further discloses a method for determining the operational status of an integrated services hub, comprising monitoring the status of a wide area network connection to the integrated services hub, and upon detecting a failure of the wide area network connection, signaling to a user of the integrated service hub that the wide area network connection has failed. Monitoring the status of the wide area network connection to the integrated services hub preferably further comprises checking the status of a network status register on a line interface chip or chip set residing in the integrated service hub and connected to the wide area network. Signaling to a user of the integrated services hub that the wide area network connection has failed preferably further comprises playing an audible warning tone in a telephone receiver connected to the integrated services hub.

The present invention further discloses an apparatus for determining the operational status of an integrated services hub supporting a plurality of telephone lines, comprising (a) a plurality of subscriber line interface circuits (SLIC), the number of SLICs equaling the number of telephone lines, with a separate SLIC corresponding with and connected to each of the telephone lines, (b) at least one subscriber line access circuit (SLAC) connected to the SLICs to detect an off-hook condition in the telephone lines; (c) a power monitor for monitoring the status of AC power to the integrated services hub; and (d) a telephony controller, the telephony controller receiving notification from the power monitor regarding the status of AC power to the integrated services hub, the telephony controller receiving notification from the SLAC of an off-hook condition in the telephone lines, and the telephony controller activating a warning signal that AC power has failed in response to the notifications from the power monitor and the SLAC.

The present invention further discloses an apparatus for determining the operational status of an integrated services hub supporting a plurality of telephone lines, comprising (a) a plurality of subscriber line interface circuits (SLIC), the number of SLICs equaling the number of telephone lines, with a separate SLIC corresponding with and connected to each of the telephone lines; (b) at least one subscriber line access circuit (SLAC) connected to the SLICs to detect an off-hook condition in the telephone lines; (c) a network connection monitor for monitoring the status of a wide area network connection to the integrated services hub; and (d) a telephony controller, the telephony controller receiving notification from the network connection monitor regarding the status of the wide area network connection to the integrated services hub, the telephony controller receiving notification from the SLAC of an off-hook condition in the telephone lines, and the telephony controller activating a warning signal that the wide area network connection has failed in response to the notifications from the network connection monitor and the SLAC.

DETAILED DESCRIPTION OF THE INVENTION

Figure 1:
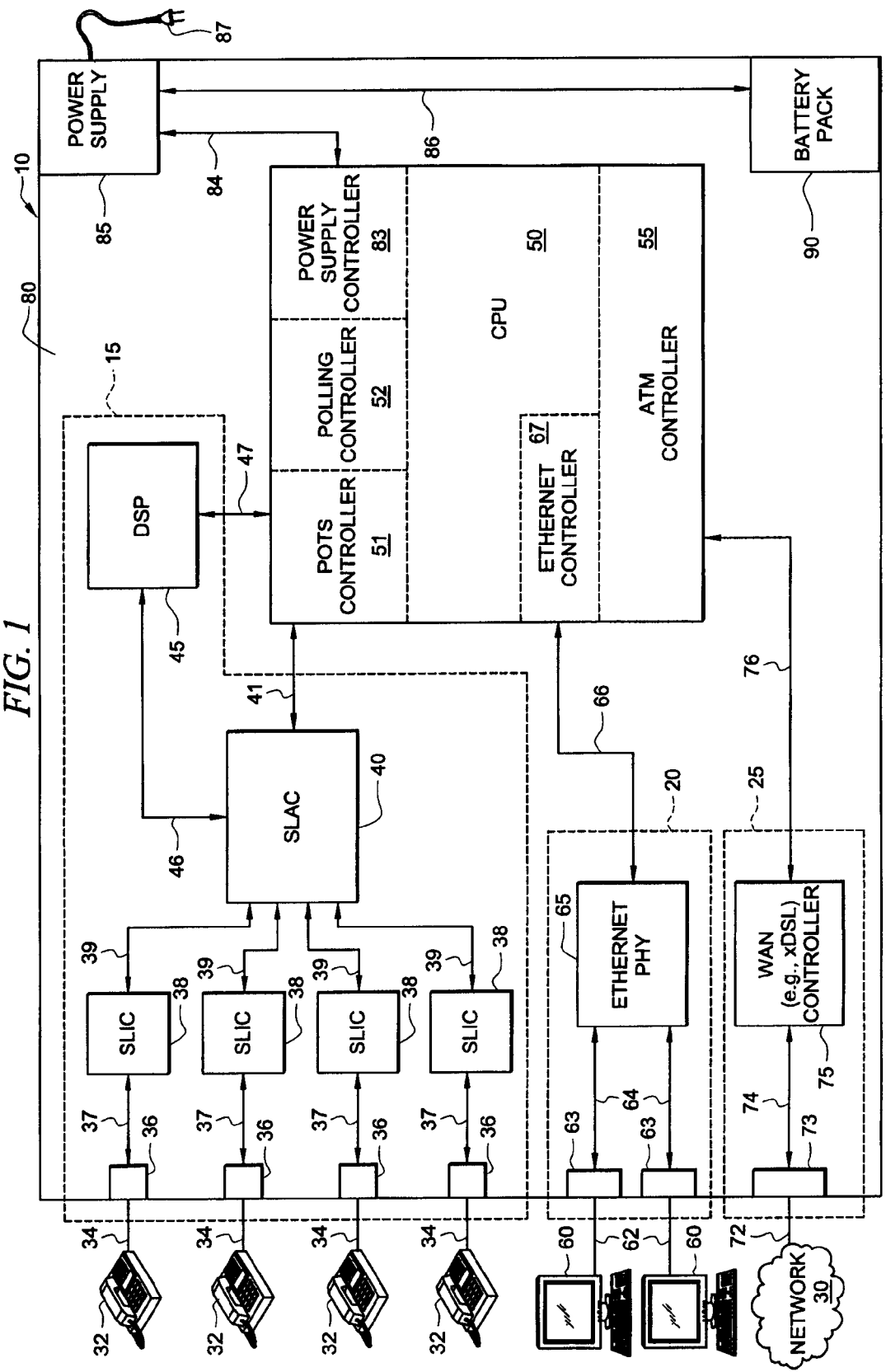
FIG. 1 is a block diagram of an integrated services hub (ISH) useful in carrying out the invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 or RJ-14 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific support circuitry in the ISH would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone line connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, Inc., the former Communications Products Division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLICs determines the number of SLACs. Examples of suitable SLACs are integrated circuit chip numbers AM79Q021 and AM79Q2243 produced by Legerity, Inc., the former Communications Products Division of Advanced Micro Devices (AMD), Inc., which are each quad-devices designed to manage four SLICs.

SLAC 40 transmits and receives control data such as line status and signaling to the central processing unit (CPU) 50 by connection 41. The CPU controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various memory mapped peripherals (for example, WAN interface 25). The CPU control software includes a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with network 30. In a preferred embodiment, ATM control module 55 is a combination of hardware and software on CPU 50.

Computers 60 are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an ethernet PHY, and more specifically an MII transceiver. CPU 50 contains an ethernet control module 67, which serves as a media access control (MAC) device and is connected to LAN PHY device 65 by connection 66. The ethernet PHY and MAC devices support a 10/100 Mbit industry standard MII ethernet connection.

Network 30 is connected by connection 72 to WAN interface 25 by WAN connector 73. WAN connector 73 is preferably an RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used for network communication mediums such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GT3180) and a multimode xDSL downloadable DSP and framer chip (Globespan GS7070). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to AC power supply 85 by connection 84. A preferred AC power supply is a universal-input (40-400 Hz, 90-270V AC RMS) switchmode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The AC power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls. Given that the ISH requires power in order to provide basic telephone service, it is important to reduce power consumption, and thereby extend battery life as long as possible.

In order for ISH 10 to communicate with network 30, WAN interface 25 must establish a connection with a network element, such as a service manager, a network server, a network controller, or the like. The procedure for establishing a network connection is dependent on the type of WAN interface. For T1 and ATM (more specifically, ATM-25) the network connection protocol is a simple link-layer protocol utilizing periodic framing signals without training or automatic adaptation. For ADSL and HDSL-2, initial physical and lower protocols (commonly referred to as "handshake and training protocols") are performed. These protocol layers are located on and used by the WAN interface to determine the parameters governing the network connection such as status of the line, data transfer rates, type and speed of equipment on both ends of the line, etc. The WAN interface determines the line condition, and both ends of the link agree on the optimum configuration for those line conditions. Where the network connection is broken, for example by a power cycle or reset of the ISH, a delay is often encountered as a result of running these handshake and training protocols. During this delay in establishing the network connection, telephony services are unavailable even though the ISH is functional. To aid the customer in troubleshooting the system, it is beneficial to inform the customer that telephony functions are unavailable because the network connection is down. The present invention provides such information to the customer by checking the status of the network connection and playing an audible warning tone in the telephone receiver if the ISH is not connected to the network.

Figure 2:
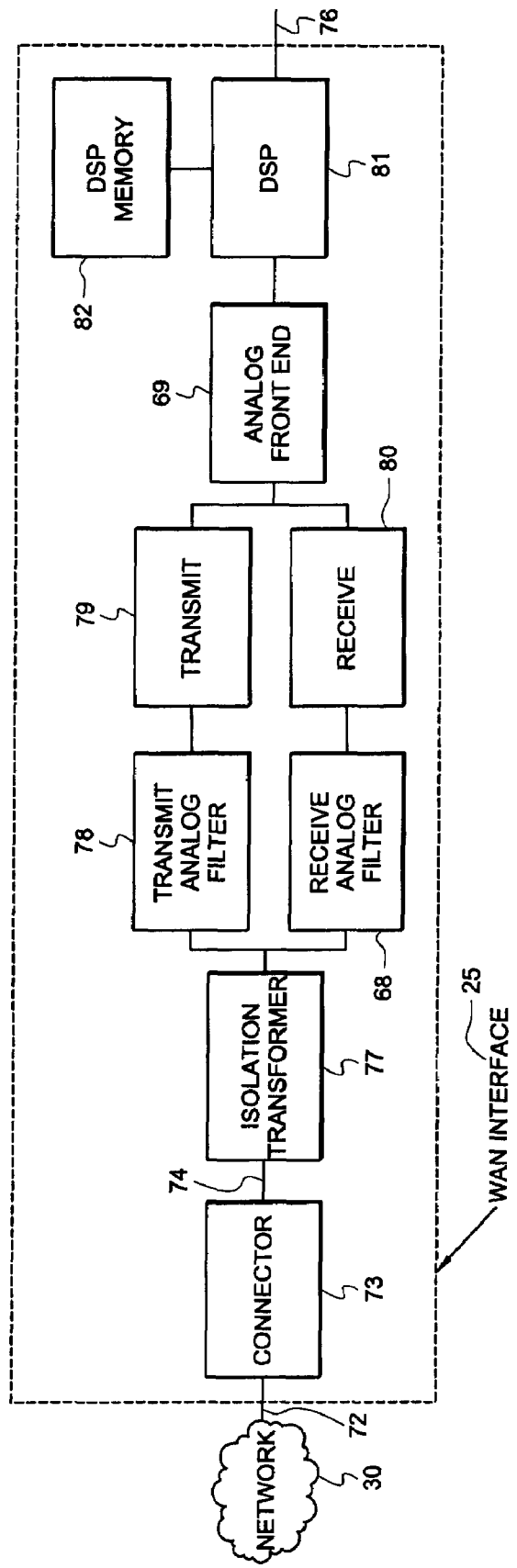
FIG. 2 is a block diagram of the wide area network interface residing in the ISH.

Each WAN interface 25 contains a line interface chip, or chip set, which is the physical interface within the ISH that is directly connected to the network communications medium (e.g., DSL line, T1 line, etc.). As arranged and connected in FIG. 2, WAN interface 25 further comprises WAN connector 73, isolation transformer 77, transmit analog filter 78, receive analog filter 68, transmit chip 79, receive chip 80, analog front end 69, WAN digital signal processor (DSP) 81, and WAN DSP memory chip 82. Incoming signals from network 30 are passed through connector 73, isolation transformer 77, receive analog filter 68, receive chip 80, analog front end 69, WAN DSP 81, and WAN DSP memory chip 82 (as directed and needed by WAN DSP 81) to ATM controller 55 (shown in FIG. 1) via connection 76. Outgoing signals are passed from ATM controller 55 via connection 76 to WAN DSP 81, WAN DSP memory chip 82 (as directed and needed by WAN DSP 81), analog front end 69, transmit chip 79, transmit analog filter 78, isolation transformer 77, and connector 73 to network 30 via connection 72. FIG. 2 is a preferred embodiment of WAN interface 25 for use with an ADSL or HDSL-2 network communication medium.

Each type of network communication medium carries data along a carrier signal. For example, a DSL line uses a constant digital carrier signal, and a T1 line uses an intermittent digital carrier signal known as a periodic framing signal. The line interface chip can determine whether a digital carrier signal is present. In the preferred ADSL or HDSL-2 embodiment of FIG. 2, if a carrier signal is present following completion of the link-layer protocols, then a network connection exists and the DSP updates an internal network status register to reflect that a network connection exists. If a carrier signal is not present following completion of the link-layer protocols, then a network connection does not exist and the DSP updates the internal network status register to reflect that a network connection does not exist. The line interface chip communicates the status of the network connection to the CPU.

Under normal operating conditions with power supplied by the primary power source, all telephone lines (and their corresponding SLICs) are maintained in standby state, and the SLAC is simultaneously monitoring all lines so that hook transitions can be detected when a customer attempts to place a call. When a customer lifts the receiver from the telephone, the SLAC detects the off-hook condition in the corresponding line and communicates the off-hook condition to POTS control module 51. Upon receiving notification of the off-hook condition, POTS control module 51 places the line (and corresponding SLIC) in active mode. POTS control module 51 checks whether a network connection exists by checking a network connection status register on ATM control module 55. ATM control module 55 periodically and regularly communicates with the line interface chip (i.e., WAN DSP 81) to determine whether a network connection exists and updates its status register accordingly. If a network connection does not exist, POTS control module 51 instructs POTS DSP 45 to send a network disabled warning tone to the receiver, which notifies the customer that that the network connection is down. If a network connection does exist, POTS control module 51 communicates (via ATM control module 55 and WAN interface 25) the off-hook condition to a network element (e.g., service manager) on network 30. With a routine call, the service manager responds (again via WAN interface 25 and ATM control module 55) with an instruction to play dial tone to the customer. POTS control module 51 instructs POTS DSP 45 to send a normal dial tone to the receiver, which notifies the customer that the ISH telephony functions are operational and that a call can be placed.

Since the ISH has a limited battery life, it is important to notify the customer that the ISH is operating on battery power, especially when loss of primary power is not self-evident such as for example when a circuit breaker trips or when the power plug is accidentally removed from the electrical outlet. It is beneficial to alert the customer to the fact that the ISH is operating on battery backup power so that the customer can adjust his or her use patterns to maximize battery life. The present invention provides such information to the customer by checking the status of the power supply and playing an audible warning tone in the telephone receiver if the ISH is operating on battery power.

When operating on battery power, the ISH preferably polls the telephone lines to preserve battery power, as described in co-pending application Sprint docket number 1497, referenced previously. When a customer lifts the receiver from the telephone, the SLAC detects the off-hook condition in the corresponding line and communicates the off-hook condition to POTS control module 51. In addition to checking whether a network connection exists (as described above), POTS control module 51 checks whether the ISH is operating on primary or battery backup power. Preferably, the status of the network connection is checked first, followed by checking the status of the power supply, with the understanding that this sequence may be reversed where desired.

Power control module 83 regularly checks power supply 85 and communicates to other control modules (located on the CPU or elsewhere) whether the ISH is operating on primary or battery backup power so that the other control modules may switch to low power operation when appropriate. The power supply contains a status register, which further comprises a bit. The state of the bit is driven directly from a signal derived from the incoming AC power. The power control module on the CPU periodically polls the bit in the status register to determine if the system is running on AC power or battery power. If the ISH is operating on primary power, normal telephony functions (including normal dial tone) are provided as described above. If the ISH is operating on battery power, telephony functions are provided as described in co-pending application Sprint docket number 1497, referenced previously. However, instead of playing normal dial tone, POTS control module 51 instructs POTS DSP 45 to superimpose a battery operation warning tone over the normal dial tone to alert the customer that the ISH is operating on battery power. In a preferred embodiment, the warning tone is halted when the customer begins dialing the phone. However, the battery operation tone could be continued while the customer is waiting for the call to be connected and during ringback. In such case, POTS control module 51 would continue to monitor the power supply and halt the battery operation warning tone upon detecting the return of primary power.

While any unique, audible tone can be used as notification (e.g., warning or status) tones, a preferred tone for the battery operation warning tone is a high pitched beep tone comprising a tone of 950 Hz lasting for 100 ms, which is superimposed over a normal dial tone. Thus, the normal dial tone is broken intermittently (for example, once per second) by a tone of 950 Hz lasting for 100 ms. A preferred tone for the network disabled warning tone is a siren tone comprising a repeating cadence of a tone of 1400 Hz lasting for 400 ms followed by a tone of 950 Hz for 400 ms. While an audible tone is a preferred method for warning a customer of problems with the network connection or power supply, other means of warning the customer may be used such as a visual indicator (i.e., warning lights, liquid crystal display (LCD)) located on the ISH.

What is claimed is:

1. An apparatus in a customer premises integrated services hub supporting a plurality of telephone lines for determining the operational status of the customer premises integrated services hub, comprising:
   (a) a plurality of subscriber line interface circuits (SLIC), the number of SLICs equaling the number of telephone lines, with a separate SLIC corresponding with and connected to each of the telephone lines,
   (b) at least one subscriber line access circuit (SLAC) connected to the SLICs to detect an off-hook condition in the telephone lines;
   (c) a power monitor for monitoring the status of AC power to the integrated services hub;
   (d) a backup battery powering the integrated services hub when AC power fails; and
   (e) a telephony controller, the telephony controller receiving notification from the power monitor regarding the status of AC power to the integrated services hub, the telephony controller receiving notification from the SLAC of an off-hook condition in the telephone lines, and the telephony controller activating a warning signal on at least one telephone line that the backup battery is powering the integrated services hub in response to notifications from the power monitor that AC power has failed and from the SLAC that an off-hook condition has occurred.

2. The apparatus of claim 1 wherein the warning signal is an audible warning tone played in a telephone receiver connected to the integrated services hub.

3. The apparatus of claim 2 wherein the audible warning tone is generated by a digital signal processor residing in the integrated services hub.

4. The apparatus of claim 1 wherein the telephony controller and the power monitor are software components that run on a central processing unit.

5. An apparatus in a customer premises integrated services hub supporting a plurality of telephone lines for determining the operational status of the customer premises integrated services hub, comprising:
   (a) a plurality of subscriber line interface circuits (SLIC), the number of SLICs equaling the number of telephone lines, with a separate SLIC corresponding with and connected to each of the telephone lines;
   (b) at least one subscriber line access circuit (SLAC) connected to the SLICs to detect an off-hook condition in the telephone lines;
   (c) a network connection monitor for monitoring the status of a wide area network connection to the integrated services hub; and
   (d) a telephony controller, the telephony controller receiving notification from the network connection monitor regarding the status of the wide area network connection to the integrated services hub, the telephony controller receiving notification from the SLAC of an off-hook condition in the telephone lines, and the telephony controller activating a warning signal on at least one telephone line that the wide area network connection has failed in response to the notifications from the network connection monitor and the SLAC.

6. The apparatus of claim 5 wherein the warning signal is an audible warning tone played in a telephone receiver connected to the integrated services hub.

7. The apparatus of claim 6 wherein the audible warning tone is generated by a digital signal processor residing in the integrated services hub.

8. The apparatus of claim 5 wherein the telephony controller and the network connection monitor are software components that run on a central processing unit.

9. In a customer premises integrated services hub of the type having a wide area network connection for coupling voice signals, a power supply receiving power from an AC power circuit in the customer premises, a backup battery powering the integrated services hub when the AC power fails, and at least one telephone line for coupling to a telephone receiver in the customer premises, apparatus for notifying a user of a telephone receiver that the backup battery is powering the integrated services hub, comprising:
   (a) at least one subscriber line interface circuit (SLIC), the number of SLICs equaling the number of telephone lines, with a separate SLIC corresponding with and connected to each of the telephone lines,
   (b) at least one subscriber line access circuit (SLAC) connected to the SLICs to detect an off-hook condition in the telephone lines;
   (c) a power monitor for monitoring the status of AC power to the integrated services hub; and
   (d) a telephony controller, the telephony controller receiving notification from the power monitor regarding the status of AC power to the integrated services hub, the telephony controller receiving notification from the SLAC of an off-hook condition in the at least one telephone line, and the telephony controller activating a warning signal on the at least one telephone line that the backup battery is powering the integrated services hub in response to the notifications from the power monitor that AC power has failed and from the SLAC that an off-hook condition has occurred.

10. The apparatus of claim 9 wherein the warning signal is an audible warning tone played in a telephone receiver connected to the integrated services hub.

11. The apparatus of claim 10 wherein the audible warning tone is generated by a digital signal processor residing in the integrated services hub.

12. The apparatus of claim 9 wherein the telephony controller and the power monitor are software components that run on a central processing unit.

13. In a customer premises integrated services hub of the type having a wide area network connection for coupling voice signals, a power supply receiving power from an AC power circuit in the customer premises, a backup power supply for powering the integrated services hub when the AC power fails, and at least one telephone line for coupling to a telephone receiver in the customer premises, apparatus for notifying a user of a telephone receiver that the wide area network connection has failed, comprising:

(a) at least one subscriber line interface circuit (SLIC), the number of SLICs equaling the number of telephone lines, with a separate SLIC corresponding with and connected to each of the telephone lines;

(b) at least one subscriber line access circuit (SLAC) connected to the SLICs to detect an off-hook condition in the telephone lines;

(c) a network connection monitor for monitoring the status of a wide area network connection to the integrated services hub; and (d) a telephony controller, the telephony controller receiving notification from the network connection monitor regarding the status of the wide area network connection to the integrated services hub, the telephony controller receiving notification from the SLAC of an off-hook condition in the at least one telephone line, and the telephony controller activating a warning signal on the at least one telephone line that the wide area network connection has failed in response to the notifications from the network connection monitor and the SLAC.

14. The apparatus of claim 13 wherein the warning signal is an audible warning tone played in a telephone receiver connected to the integrated services hub.

15. The apparatus of claim 14 wherein the audible warning tone is generated by a digital signal processor residing in the integrated services hub.

16. The apparatus of claim 13 wherein the telephony controller and the network connection monitor are software components that run on a central processing unit.

* * * * *